United States Patent
Karandikar et al.

(10) Patent No.: US 10,506,508 B2
(45) Date of Patent: Dec. 10, 2019

(54) HIGHLY AVAILABLE NETWORK ARCHITECTURE FOR A LTE BASED COMMUNICATION NETWORK

(71) Applicant: Indian Institute of Technology Bombay, Mumbai (IN)

(72) Inventors: Abhay Karandikar, Mumbai (IN); Pranav Kumar Jha, Gurgaon (IN); Akshatha Nayak M, Bangalore (IN); Pon Nidhya Elango, Chennai (IN); Pravin P. Magar, Aurangabad (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 57 days.

(21) Appl. No.: 15/643,269

(22) Filed: Jul. 6, 2017

(65) Prior Publication Data

US 2017/0311253 A1  Oct. 26, 2017

(30) Foreign Application Priority Data

May 22, 2017  (IN) .............................. 201721017966

(51) Int. Cl.
*H04W 48/20* (2009.01)
*H04W 24/04* (2009.01)
*H04W 84/04* (2009.01)
*H04W 88/08* (2009.01)

(52) U.S. Cl.
CPC ........... *H04W 48/20* (2013.01); *H04W 24/04* (2013.01); *H04W 84/042* (2013.01)

(58) Field of Classification Search
CPC ...... H04B 7/26; H04W 8/085; H04W 72/005; H04W 40/22; H04W 36/04; H04W 28/0215; H04W 72/02; H04W 72/00; H04W 72/0453; H04W 84/047; H04W 80/04; H04W 8/26; H04W 40/00; H04W 84/005; H04W 4/22; H04W 48/20; H04W 24/04; H04W 84/042; H04W 88/08
See application file for complete search history.

(56) References Cited

U.S. PATENT DOCUMENTS

| | | | |
|---|---|---|---|
| 6,907,237 B1 * | 6/2005 | Dorenbosch | H04W 24/00 455/404.1 |
| 9,369,941 B2 * | 6/2016 | Shoshan | H04W 76/10 |

(Continued)

*Primary Examiner* — Benjamin H Elliott, IV
*Assistant Examiner* — Nevena Zecevic Sandhu
(74) *Attorney, Agent, or Firm* — Mannava & Kang, P.C.; Vinay Malik

(57) ABSTRACT

A highly available network architecture for a LTE based communication network. Embodiments herein disclose an architecture for a highly available and resilient Long Term Evolution (LTE) based wireless communication network, wherein the network comprises of at least one Base Station (BS) further comprising of a merged LTE eNodeB (eNB) and a LTE Evolved Packet Core (EPC) entities and except for a single active BS, the other BSs can act as a backup for the currently active BS. Embodiments herein disclose a network architecture for a highly available and resilient architecture for Long Term Evolution (LTE) based wireless communication network, wherein a LTE radio interface is used for connectivity between components of the LTE communication network.

19 Claims, 9 Drawing Sheets

(56) References Cited

U.S. PATENT DOCUMENTS

| | | | | |
|---|---|---|---|---|
| 2008/0064361 A1* | 3/2008 | Bjork | ............... | H04W 24/04 |
| | | | | 455/403 |
| 2010/0265818 A1* | 10/2010 | Chen | ............... | H04B 1/74 |
| | | | | 370/217 |
| 2013/0336176 A1* | 12/2013 | Rubin | ............... | H04B 7/26 |
| | | | | 370/280 |
| 2016/0288744 A1* | 10/2016 | Rutherford | ............... | B60L 1/00 |
| 2017/0353913 A1* | 12/2017 | Sun | ............... | H04W 48/16 |
| 2019/0053150 A1* | 2/2019 | Abouelmaati | ............... | H04W 52/0206 |

\* cited by examiner

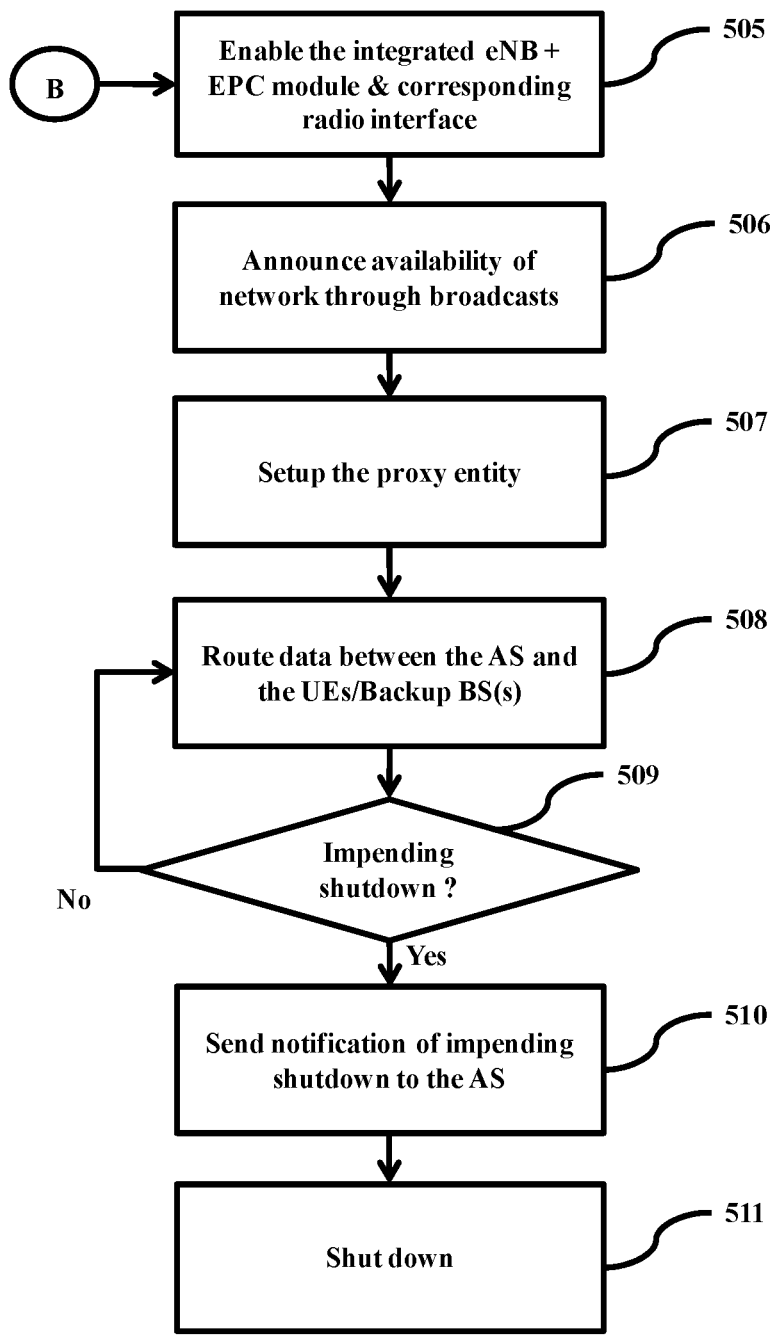

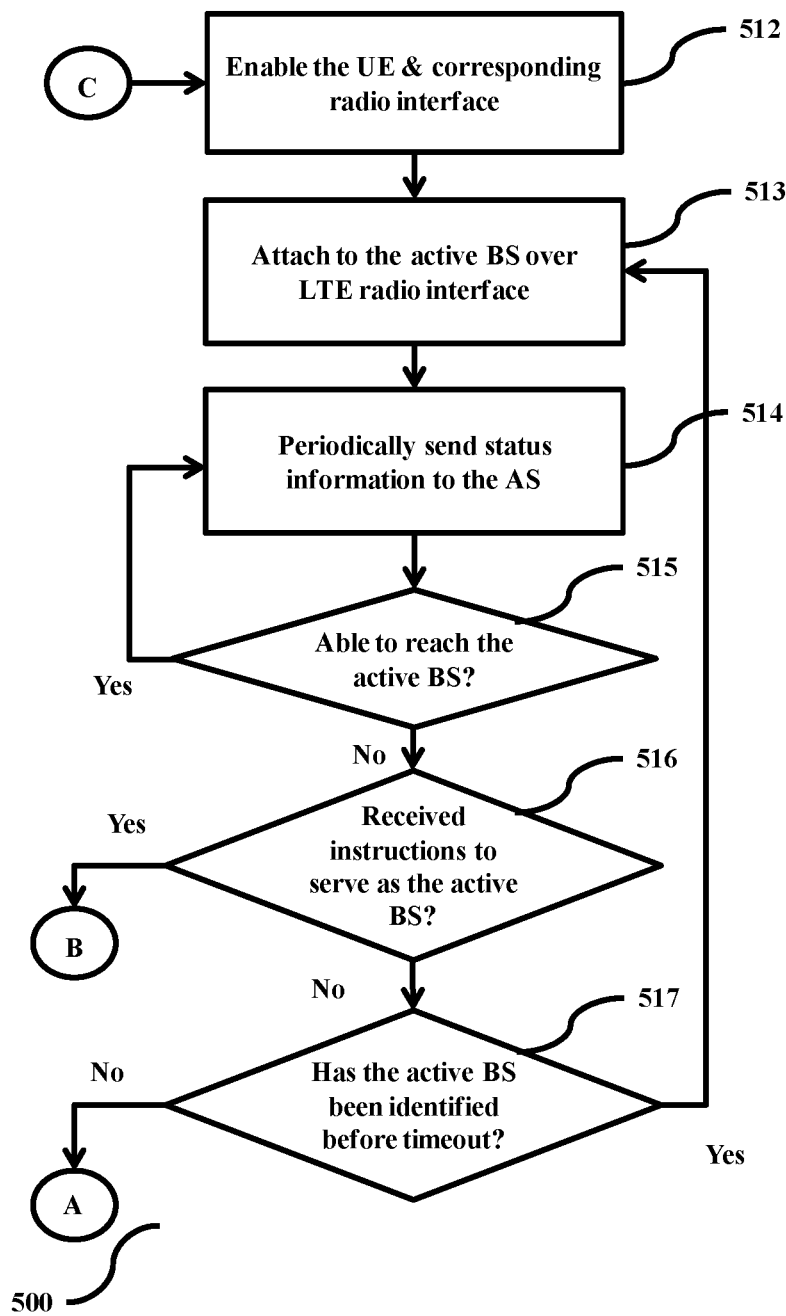

HIGHLY AVAILABLE NETWORK ARCHITECTURE FOR A LTE BASED COMMUNICATION NETWORK

CROSS REFERENCES TO RELATED APPLICATIONS

This applications claims priority from, IN Application Number 201721017966, filed on May 22, 2017, the disclosure of which is incorporated by reference herein.

TECHNICAL FIELD

Embodiments herein relate to Long Term Evolution (LTE) communication networks (as disclosed in 3GPP TS 36.300), and more particularly to ensuring high availability of rapidly deployable LTE communication networks over a region.

BACKGROUND

Broadly, the LTE communication network architecture involves at least one User Equipment (UE), at least one eNodeB (eNB) and Evolved Packet Core (EPC) nodes (comprising of various functional elements such as Mobility Management Entity (MME), Packet Data Network Gateway (PGW), Serving Gateway (SGW), Home Subscriber Server (HSS), Policy and Charging Rules Function (PCRF), and so on). An Application Server (AS) could also be a part of the network architecture, connected to the EPC (to the PGW) over the SGi interface using a wired link. The AS controls and coordinates communication amongst the UEs.

For the purpose of certain types of public safety applications, which demand rapidly deployable systems, a large and complex system comprising of multiple entities in the EPC/core, network might not be suitable. Also, several applications of public safety networks do not require the public Internet for operation, or are required to be deployed in remote regions which do not have an existing infrastructure, while providing connectivity only among the users of the service, typically over a local region.

Considering a case where the eNB fails, UEs would be cut-off from the AS and this could result in disruption of the network operations. As the eNB serves as the primary communication anchor for the UEs to connect to the EPC and AS, high availability of the eNB is very crucial for mission critical applications.

OBJECTS

The principal object of embodiments herein is to disclose an architecture that could realize high availability and resilience in a LTE based wireless communication network, wherein the network comprises of at least one BS, wherein the BS comprises of merged LTE eNB and EPC entities.

Another object of embodiments herein is to disclose an architecture that could realize high availability and resilience in a LTE based wireless communication network, wherein the network comprises of at least one BS, wherein at any given point in time, except for a single active BS, others BSs act as a backup for the currently active BS.

Another object of embodiments herein is to disclose an architecture that could realize high availability and resilience in a LTE based wireless communication network, wherein a LTE radio interface is used for connectivity between components of the LTE communication network.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which:

FIGS. 5a, 5b, and 5c are flowcharts depicting the functioning of the active BS, and the backup BS, according to embodiments as disclosed herein.

DETAILED DESCRIPTION

Figure 1:
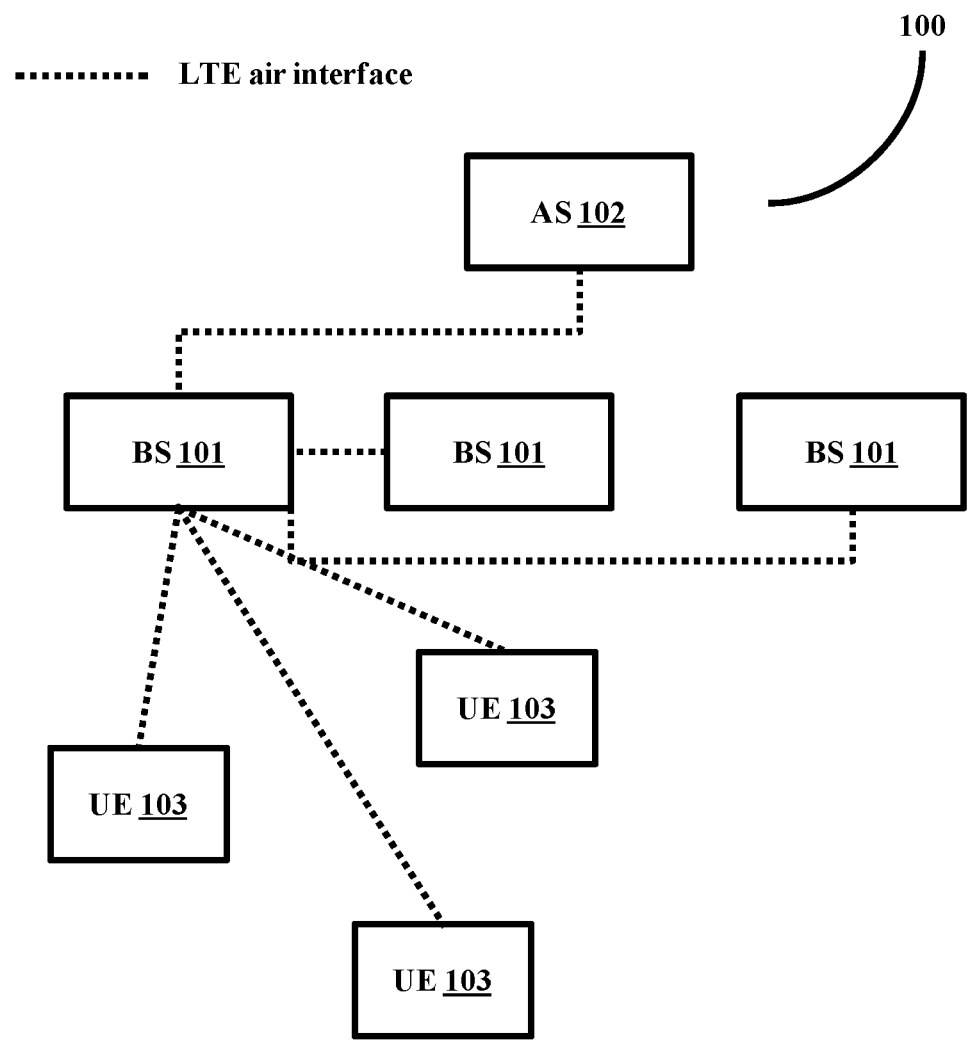
FIG. 1 depicts a LTE communication network comprising of at least one BS and an AS, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an architecture that could realize high availability and resilience in a LTE based wireless communication network. Referring now to the drawings, and more particularly to FIGS. 1 through 6, where similar reference characters denote corresponding features consistently throughout the figures, there are shown preferred embodiments.

Embodiments herein disclose a portable Base Station (BS) for use in Long Term Evolution (LTE) based communication networks). The BS comprises of a merger of the LTE eNB and EPC entities (such as Mobility Management Entity (MME), Packet Data Network Gateway (PGW), Serving Gateway (SGW), Home Subscriber Server (HSS), Policy and Charging Rules Function (PCRF), and so on) in a single node. In addition, the BS can also comprise of a UE module.

In an embodiment herein, the network can comprise of a plurality of BSs. At any given point in time, except for a single active BS, other BS nodes act as a backup for the currently active BS and can take up the role of an active BS, in case of a failure of the currently active BS. In an embodiment herein, the BS can be portable and can be mounted on vehicles (wherein the vehicles can be at least one terrestrial or flying vehicles).

Embodiments herein disclose use of a LTE radio interface for connectivity between components of the LTE communication network. For example, an Application Server (AS) can use a LTE radio interface (such as a Uu interface) to connect to the PGW of the integrated eNodeB+EPC entity in the active BS node.

The BS nodes comprise of an UE module which allows the backup BS(s) to connect to the active BS using the radio interface of the UE module and exchange information.

Figure 2A:
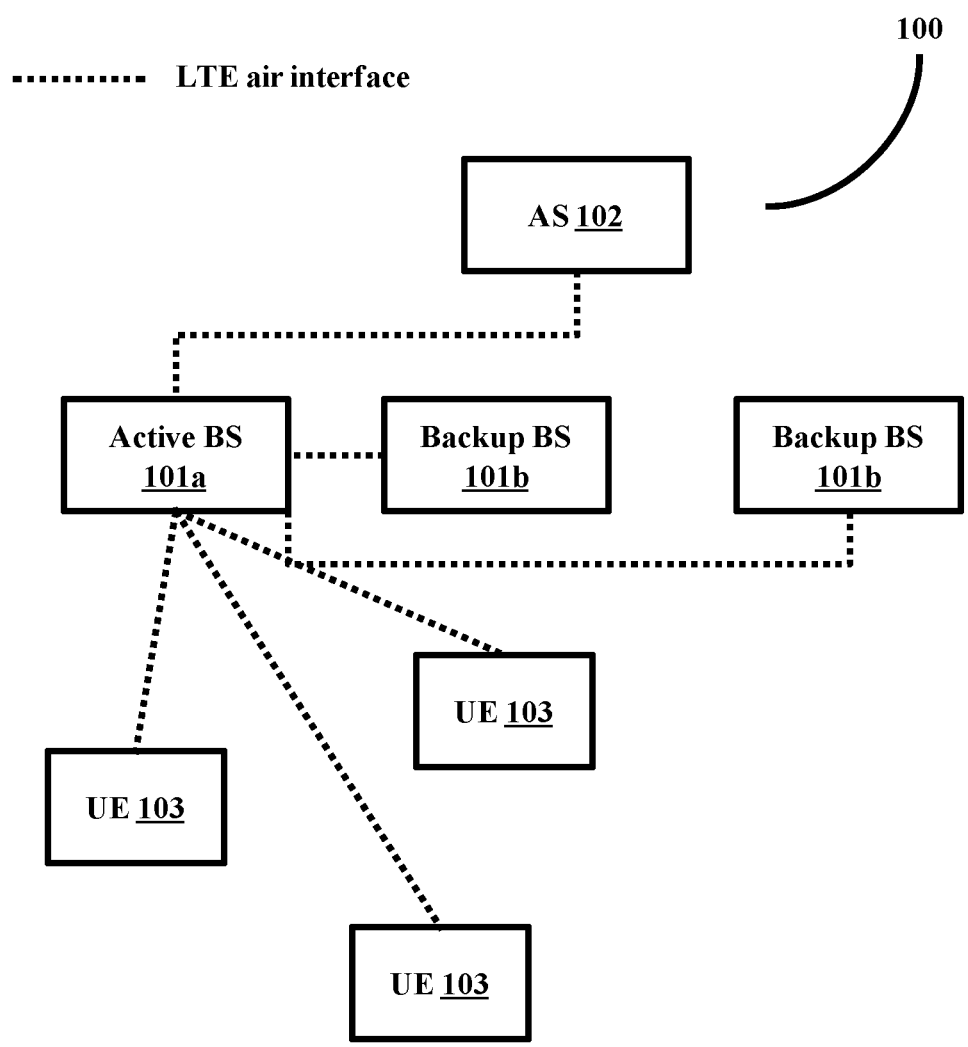
FIGS. 2a and 2b depict examples of a backup BS starting to work as the active BS in the event of a failure of the current active BS, according to embodiments as disclosed herein.

FIG. 1 depicts a LTE communication network comprising of at least one BS and an AS. The network 100 comprises of a plurality of BSs 101, wherein the active BS 101 is connected to an AS 102. At least one of the BSs 101 can be a portable BS. One of the BSs 101 can be an active BS 101a, wherein the active BS can serve at least one User Equipment (UE) 103 and the other BSs 101 can serve as backup BSs 101b (as depicted in FIG. 2a). In an embodiment herein, the active BS 101a can be a stationary BS, and the backup BSs 101b can be portable BSs. In an embodiment herein, the active BS 101a and the backup BSs 101b can be portable BSs. In an embodiment herein, the active BS 101a can be a stationary BS, and at least one of the backup BSs 101b can be portable BSs. The backup BSs can be stationary BSs. Each of the BSs 101 can be connected to the AS 102 via the active BS 101, using a LTE air interface, such as a Uu interface. In an embodiment herein, the BS nodes also comprise of a UE module and the backup BS 101b can connect to the active BS 101a using the LTE Uu radio interface of this UE module.

Figure 2B:
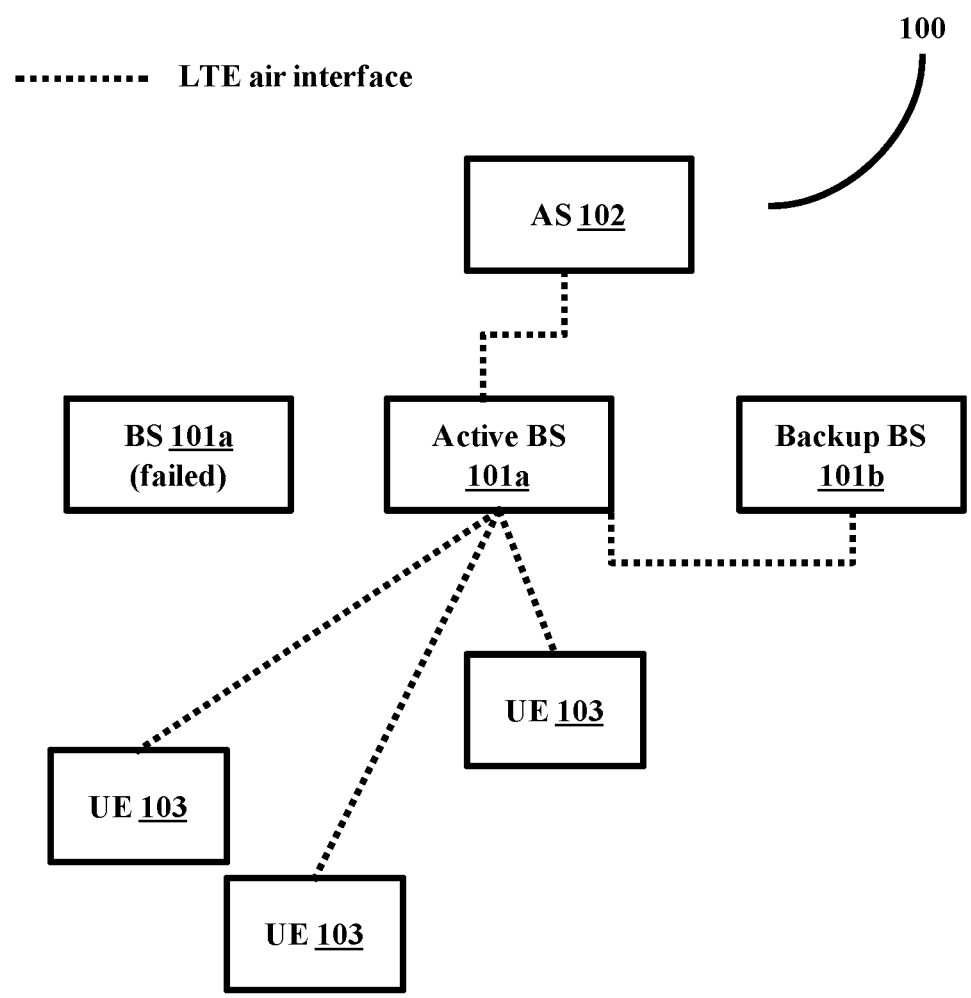

As depicted in FIGS. 2a and 2b, one of the Backup BS(s) shall take over as the active BS when the currently active BS shuts down. The currently active BS could gracefully shutdown by intimating the AS of its impending failure, which would allow the AS to determine one of the backup BS(s) to serve as the active BS. When the active BS shuts down suddenly, the AS cannot reach the backup BS(s) and cannot designate a new active BS from among the backup BS(s). A predefined static ordering can enable one of the backup BS nodes to switch to active role in such a scenario. Thus, one of the backup BS(s) could take over as active BS on receiving a command from the AS in the event of graceful shutdown of active BS or based on the predefined configuration in the event of sudden failure of active BS.

In an embodiment herein, the network 100 can comprise of a preconfigured static ordering of the BSs 101, which can enable one of the backup BS nodes to switch to the active role in the absence of any instructions from the AS 102 in the event of sudden shutdown of currently active BS. A static ordering could be defined for one or more BS nodes deployed initially. With the introduction of new BS nodes or depending on the deployment scenario and exact application, the static ordering could be updated or extended as required. The BS(s) shall also follow the pre-defined static ordering for determining an active BS, if more than one BS is deployed initially. The static management of the BS(s) can include methods for handshaking between the BS(s) while trying to establish an active BS initially or thereafter due to sudden failure of currently active BS.

Figure 3:
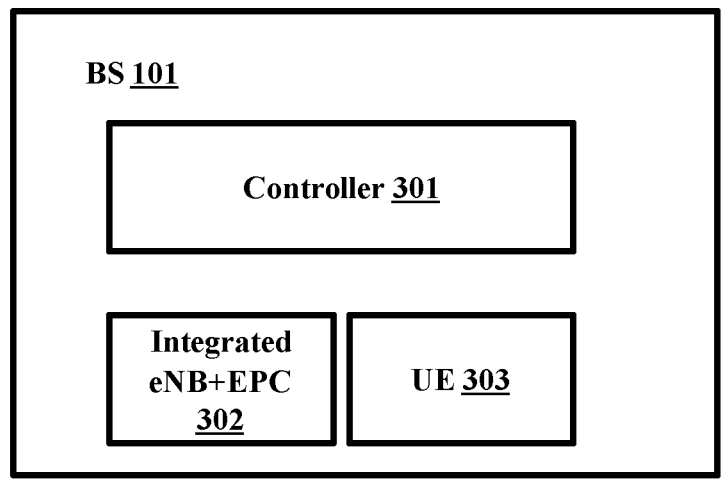
FIG. 3 depicts the BS, according to embodiments as disclosed herein.

FIG. 3 depicts the BS. The BS 101 comprises of a controller 301, an integrated eNB+EPC module 302, and a UE 303. The controller 301 manages the use of the integrated eNB+EPC module 302, and the UE 303 in the BS depending on the role of the BS node. In an embodiment herein, the controller 301 can enable the BS 101 to serve as the active BS by enabling the use of the eNB+EPC module 302 and the corresponding radio interface to allow the AS and backup BS nodes to connect to it. The controller 301 can enable the eNB+EPC module 302 for the BS to serve as active BS based on a pre-defined static configuration. The controller 301 can activate the eNB+EPC module 302 for the BS to serve as active BS, based on the instructions from the AS 102 in case of a graceful shutdown of the active BS. When the BS node is to serve as a redundant backup node, the controller 301 enables the use of the UE 303 and the corresponding radio interface to connect to the active BS and to update the AS 102 of its status. The backup BS(s) would use the UE 303 and corresponding radio interface to only participate in handshaking and exchange of status/instructions with the AS 102 via the active BS, unlike the typical UEs in the network which would be involved in the actual applications of the network such as calls, video streaming and so on.

Figure 4:
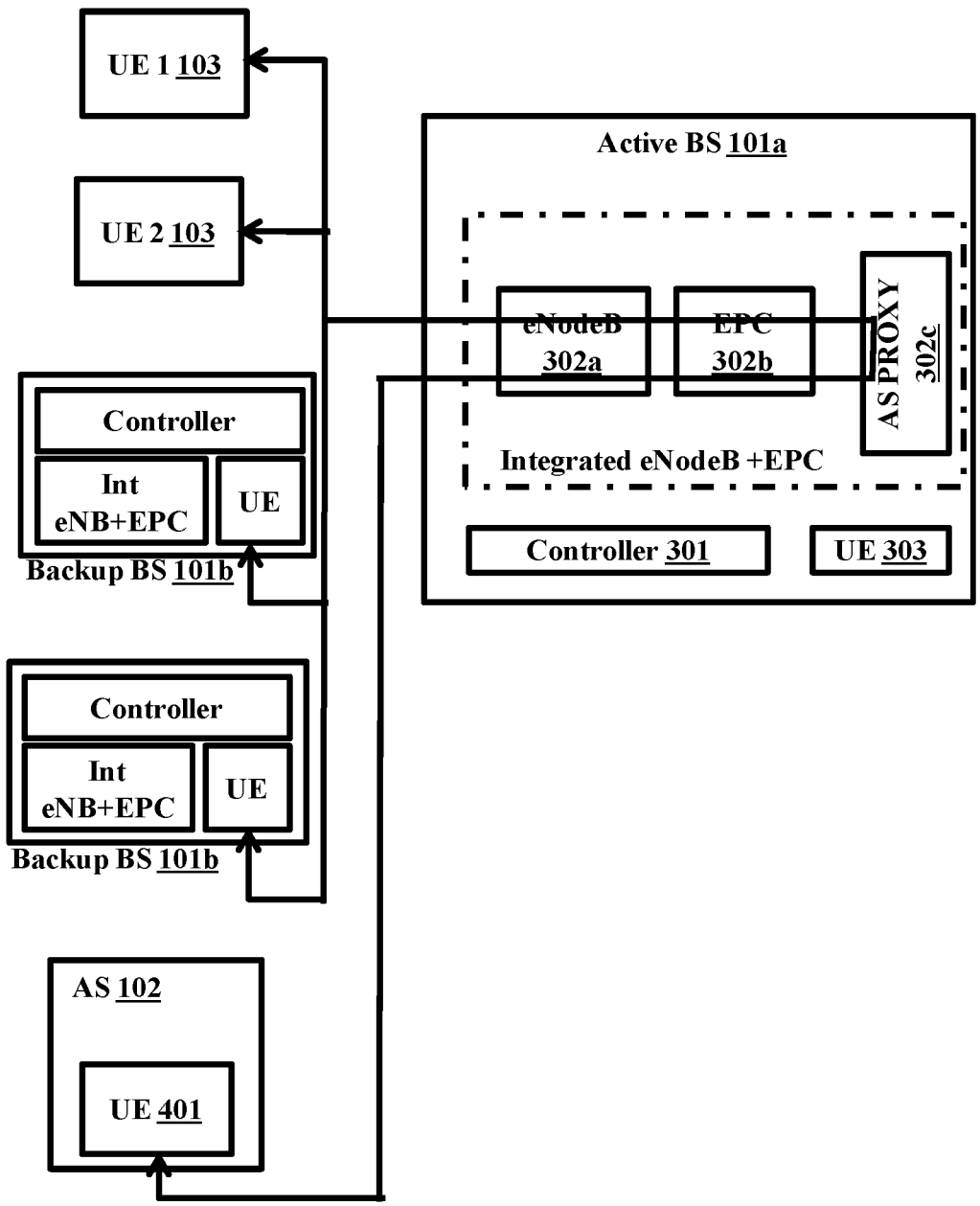
FIG. 4 depicts the flow of data between the UEs, the active BS, the backup BS and the AS, according to embodiments as disclosed herein.

The AS 102 comprises of a UE module 401 and would require additional hardware/software capabilities depending on the exact application. For instance, in a mission critical LTE network supporting video streaming from UEs to the AS 102, the AS 102 can comprise of additional memory/storage capabilities compared to a typical UE in the network. The eNB+EPC module 302 can further comprise of an eNB 302a, an EPC 302b, and the proxy entity 302c. The AS 102 shall attach to the active BS using the UE 401, further to which the AS 102 shall register its identity with a proxy entity 302c in the active BS. As depicted in FIG. 4, the proxy entity 302c in the integrated eNB+EPC module 302 of the active BS, shall maintain a route entry/rule to automatically loopback data flows from the UEs/backup BS(s) to the AS 102 and vice-versa. Data received from a UE at the active BS via the Uu LTE radio interface of the eNB 302a, shall be looped back to the AS 102 via the same Uu radio interface. In the event of one of the backup BS(s) becoming active BS, the AS 102 shall attach and register itself with the Proxy entity 302c of the new active BS dynamically, using the wireless LTE radio interface of its UE module and does not have any other physical connection requirements. This mechanism shall allow the smooth flow of data from UEs received on the uplink and then forwarded on the downlink to the AS 102.

Figure 5A:
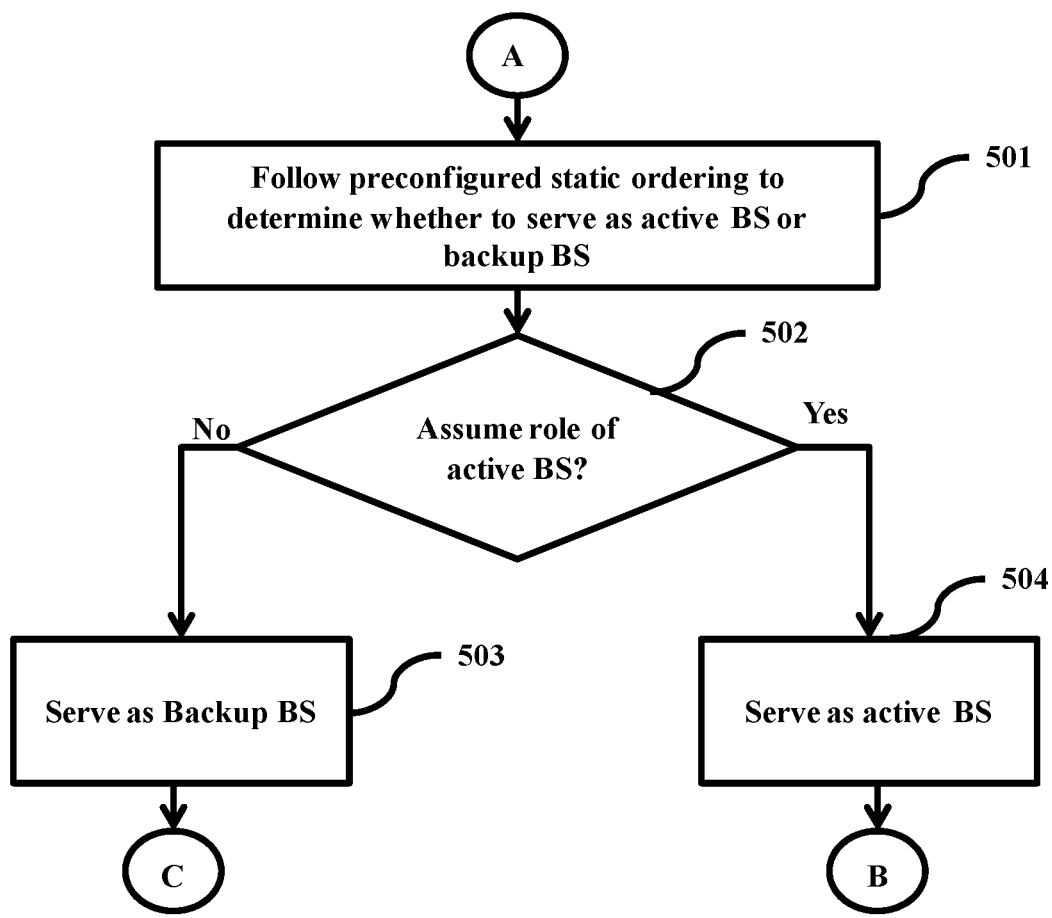

FIGS. 5a, 5b, and 5c are flowcharts depicting the functioning of the active BS, and the backup BS. As depicted in FIG. 5a, initially the BS(s) assume (502) the role of the backup BS 101b (503) or the active BS 101a (504) based on pre-configured static ordering (501). FIGS. 5b and 5c depict the subsequent role played by the active BS 101a and backup BS 101b.

FIG. 5b depicts an embodiment wherein the active BS informs the AS of its impending shutdown. The active BS 101a enables (505) relevant modules such as the integrated eNB+EPC module 302 and the corresponding radio interface and announces (506) the availability of the network. This enables entities such as the UEs, backup BSs 101b and the AS 102 to attach to the active BS 101a over the LTE radio interface. The active BS 101a setups (507) the proxy entity 302c to route data between the connected entities. The active BS 101a further routes (508) data between the connected entities as required. In case of an impending shutdown (509), the active BS 101a sends (510) a notification of its impending shutdown to the AS 102, and then shuts (511) down.

In FIG. 5c, the backup BS 101b enables (512) the UE 304 and the corresponding radio interface and attaches (513) to the active BS 101a over the radio interface. The backup BS 101b provides (514) information to the AS 102, as required by an election mechanism used by the AS 102. This information can comprise of current location of the backup BS 101b, battery/power of the backup BS 101b, transmit power and height (in case BS(s) are mounted on UAVs) of the backup BS 101b, and so on. If the backup BS 101b is unable (515) to reach the active BS 101a, the backup BS 101b checks (516) if it has received instructions from the AS 102 to serve as the active BS 101a. If the backup BS 101b has received instructions from the AS 102 to serve as the active BS 101*a*, further to the impending shutdown of the currently active BS, the backup BS 101*b* assumes the role of active BS. If the backup BS 101*b* has not received instructions from the AS 102 to serve as the active BS 101*a*, the backup BS 101*b* checks (517) if it is able to identify a new active BS 101*a* that could have been designated by the AS further to the graceful shutdown of the previously active BS, before the expiry of a pre-configured timeout. If the new active BS 101*a* has been identified before a pre-configured timeout, the backup BS 101*b* connects to the new active BS 101*a* by continuing to step 512. If the new active BS 101*a* has not been identified before a pre-configured timeout, further to the sudden failure of the active BS, the process goes to step 501 for one of the backup BS(s) to come up as the active BS based on the pre-defined static ordering. The various actions in method 500 may be performed in the order presented, in a different order or simultaneously. Further, in some embodiments, some actions listed in FIGS. 5*a*, 5*b* and 5*c* may be omitted.

Figure 6:
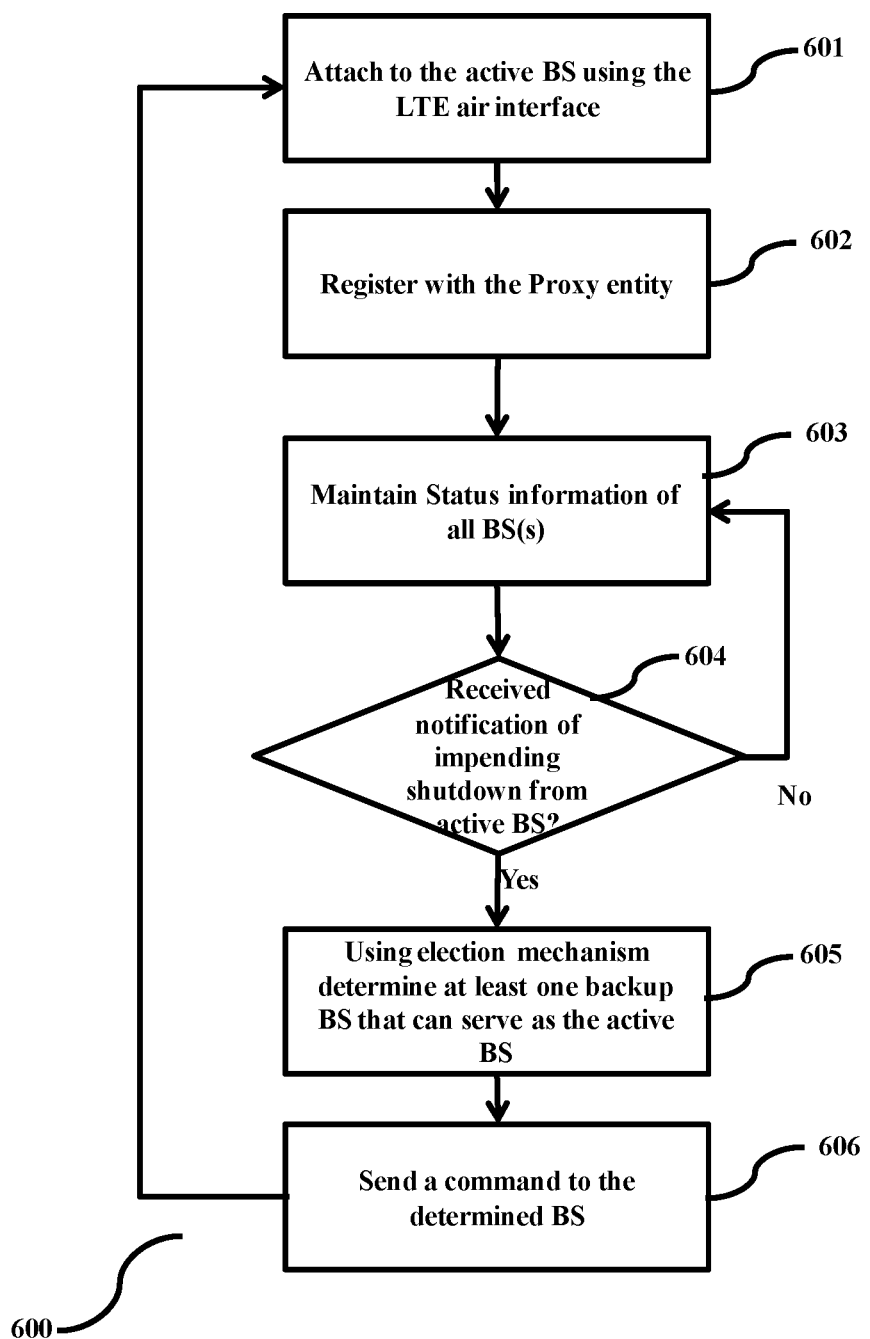
FIG. 6 is a flowchart depicting the functioning of the AS, according to embodiments as disclosed herein.

FIG. 6 is a flowchart depicting the functioning of the AS. The AS 102 shall serve as the controlling entity for managing the active BS and the plurality of backup BS(s) and shall be able to designate one of the backup BS(s) as the active BS using an election mechanism, when there is a possibility of graceful shutdown of the currently active BS. The AS 102 attaches (601) to the active BS 101*a* using the LTE air interface and registers (602) its identity with the proxy entity 302*c*. The AS 102 maintains (603) status information of all BSs (101*a*, 101*b* ), using periodic updates received from the BSs (101*a*, 101*b* ). The AS 102 can distinguish status updates sent by backup BS(s) from the data traffic from actual UEs through appropriate application level handling and shall maintain the state of all the BS(s). On receiving (604) a notification of an impending shutdown from the active BS 101*a*, the AS 102 determines (605) at least one backup BS 101*b* that can serve as the active BS 101*a*. The AS 102 can determine this using an election mechanism based on factors such as the current location, power/battery status, transmit power and height (in case BS(s) are mounted on UAVs) of the backup BS 101*b*, the bandwidth requirements of the UEs and the number of UEs to be served. The AS 102 can prioritize among these factors or appropriately weigh the different factors while selecting an active BS, depending on the exact application or deployment scenario. In an embodiment herein, the AS shall identify the impending shutdown of the active BS based on factors such as Battery/Power status or Signal Strength, which could be periodically transmitted by the active BS. The AS 102 further sends (606) a command to at least one backup BS 101*b* that can serve as the active BS 101*a*. The various actions in method 600 may be performed in the order presented, in a different order or simultaneously. Further, in some embodiments, some actions listed in FIG. 6 may be omitted.

The architecture allows for rapid deployment due to an integrated BS and usage of LTE radio interface for communication between components. As the need to physically setup the wired link between BS and AS is eliminated, the AS can automatically connect to a new active BS node, in case the currently active BS goes down due to an eventuality. In this way, it is possible to autonomously maintain a sustained connection between UEs and the AS using a multitude of BSs reducing the impact of any mishaps. The AS could be mobile and also be easily replaced, if required.

Embodiments herein are able to achieve a highly available and resilient network architecture with support for sustained communication between users even if multiple BSs go down one after another, by using a plurality of backup BS nodes and usage of the LTE air interface for connecting all network components.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A Long Term Evolution (LTE) based communication network, comprising of an active Base Station (BS), at least one backup BS, and at least one Application Server (AS), wherein the active BS and the at least one backup BS includes an integrated eNodeB (eNB)+Evolved Packet Core (EPC) module, wherein the active BS is configured for:
   sending information to the at least one AS on failing, wherein the information includes at least one of a battery status and signal strength;
   wherein the at least one AS is connected to the active BS using a LTE air interface, wherein the at least one AS is configured for;
   registering with a proxy entity of the integrated eNB+EPC module in the active BS for receiving the information of the active BS and at least one information of User Equipments (UEs) and the at least one backup BS;
   identifying an impending shutdown of the active BS based on the received information of the active BS;
   determining the at least one backup BS that can serve as the active BS using an election mechanism, on identifying the impending shutdown of the active BS, wherein determining the at least one backup BS using the election mechanism includes:
   maintaining the at least one information of the at least one backup BS received through the active BS, that is required for the election mechanism, wherein the at least one information of the at least one backup BS includes at least one of current location of the at least one backup BS, power of the at least one backup BS, and transmit power and height of the at least one backup BS;
   analyzing the at least one information of the at least one backup BS;
   selecting the at least one backup BS to serve as the active BS by assigning at least one weight to the received at least one information based on a deployment scenario; and
   sending a command to the at least one determined backup BS; and
   wherein the at least one backup BS is connected to the active BS using the LTE air interface, wherein the at least one backup BS is configured for:
   working as the active BS based on at least one of the command received from the at least one AS depending on the election mechanism and a pre-configured static ordering, on the active BS failing.

2. The network, as claimed in claim 1, wherein the active BS is at least one of a portable BS; and a stationary BS.

3. The network, as claimed in claim 1, wherein the at least one backup BS is at least one of a portable BS; and a stationary BS.

4. The network, as claimed in claim 1, wherein the active BS is further configured for
enabling the integrated eNB+EPC module and a corresponding LTE radio interlace;
setting up the proxy entity of the integrated eNB+EPC module tor maintaining at least one of a route entry and a rule to automatically loopback data flows from the UEs/backup Base stations (BSs) to the at least one AS and vice-versa; and
enabling the backup BSs to communicate with the at least one AS using the proxy entity, the integrated eNB+EPC module and the corresponding LTE radio interface.

5. The network, as claimed in claim 1, wherein the at least one backup BS is configured for
attaching to the active BS using a User Equipment (LTE) module and a corresponding LTE radio interface for exchanging of at least one status with the at least one AS; and
providing the at least one information required for the election mechanism to the at least one AS via the active BS, wherein the at least one information includes at least one of the current location of the at least one backup BS, the power of the at least one backup BS, and the transmit power and height of the at least one backup BS.

6. The network, as claimed in claim 1, wherein the network comprises of the preconfigured static ordering of the active BS and the at least one backup BS, which enables one of the at least one backup BS to switch to serve as the active BS in absence of any instructions from the at least one AS due to sudden shutdown of the active BS.

7. The network, as claimed in claim 6, wherein the preconfigured static ordering is updated based on at least one of introduction of new BS nodes and a deployment scenario associated with the introduced new BS nodes.

8. A method for communicating using a Long Term Evolution (LTE) based communication network, the network comprising of an active Base Station (BS), at least one backup BS, and at least one Application Server (AS), wherein the active BS and the at least one backup BS includes an integrated eNodeB (eNB)+Evolved Packet Core (EPC) module and the at least one AS and the at least one backup BS are connected to the active BS using a LTE air interface, the method comprising:
sending, by the active BS, information to the at least one AS on failing, wherein the information includes at least one of a battery status and signal strength;
registering, by the at least one AS, with a proxy entity of the integrated eNB +EPC module in the active BS for receiving the information of the active BS and at least one information of User Equipments (UEs) and the at least one backup BS;
identifying, by the at least one AS, an impending shutdown of the active BS based on the received information of the active BS;
determining, by the at least one AS, the at least one backup BS that can serve as the active BS using an election mechanism, on identifying the impending shutdown of the active BS, wherein determining the at least one backup BS using the election mechanism includes:
maintaining the at least one information of the at least one backup BS received through the active BS, that is required for the election mechanism, wherein the at least one information of the at least one backup BS includes at least one of current location of the at least one backup BS, power of the at least one backup BS, and transmit power and height of the at least one backup BS;
analyzing the at least one information of the at least one backup BS; and
selecting the at least one backup BS to serve as the active BS by assigning at least one weight to the received at least one information based on a deployment scenario;
sending, by the at least one AS, a command to the at least one determined backup BS; and
working, by the at least one backup, as the active BS based on at least one of the command received from the at least one AS depending on the election mechanism and a pre-configured static ordering, on the active BS failing.

9. The method, as claimed in claim 8, wherein the active BS is at least one of a portable BS; and a stationary BS.

10. The method, as claimed in claim 8, wherein the at least one backup BS is at least one of a portable BS and a stationary BS.

11. The method, as claimed in claim 8, wherein the method further comprises
enabling the integrated eNB+EPC module and a corresponding LTE radio interface by the active BS;
setting up the proxy entity of the integrated eNB+EPC module (302) by the active BS for maintaining at least one of a route entry and a rule to automatically loopback data flows from the UEs/backup Base stations (BSs) to the at least one AS and vice-versa; and
enabling the backup BSs to communicate with the at least one AS using the proxy entity, the integrated eNB+EPC module and the corresponding LTE radio interface by the active BS.

12. The method, as claimed in claim 8, wherein the method further comprises
attaching to the active BS using a User Equipment (UE) module by the at least one backup BS for exchanging of at least one status with the at least one AS; and
providing the at least one information required for the election mechanism to the at least one AS via the active BS by the at least one backup BS, wherein the at least one information includes at least one of the current location of the at least one backup BS, the power of the at least one backup BS, and the transmit power and height of the at least one backup BS.

13. The method, as claimed in claim 8, wherein the method further comprises of setting up the preconfigured static ordering of the active BS and the at least one backup BS, which enables one of the at least one backup BS to switch to serve as the active BS in absence of any instructions from the at least one AS due to sudden shutdown of the active BS.

14. The method, as claimed in claim 13, wherein the method further comprises of providing support for updating the preconfigured static ordering based on at least one of introduction of new BS nodes and a deployment scenario associated with the introduced new BS nodes.

15. A Base Station (BS) in a Long Term Evolution (LTE) based communication network, the network comprising of at least one backup BS, and at least one Application Server (AS), wherein the BS comprises:
a controller;

an integrated eNodeB (eNB)+Evolved Packet Core (EPC) module including a LTE radio interface and a proxy entity; and a User Equipment (UE) module including the LTE radio interface, wherein the controller is configured for:

enabling the integrated eNB+EPC module and the corresponding LTE radio interface to:

allow the BS to act as an active BS and to connect with the at least one AS, the at least one backup BS and at least one UE;

allow the BS to send information to the at least one AS, wherein the information is used by the at least one AS for determining an impending shutdown of the active BS and the information includes at least one of a battery status and signal strength; and allow the BS to provide at least one information received from the at least one backup BS to the at least one AS, wherein the at least one information includes at least one of current location of the at least one backup BS, power of the at least one backup BS, and transmit power and height of the at least one backup BS and the at least one information is required by the at least one AS for an election mechanism on determining the impending shutdown of the BS, wherein the election mechanism includes analyzing the at least one information of the at least one backup BS and assigning at least one weight to the at least one information to select the at least one backup BS that can serve as the active BS;

setting up the proxy entity of the integrated eNB+EPC module;

enabling the at least one backup BS to communicate with the at least one AS using the proxy entity, the integrated eNB +EPC module and the corresponding LTE radio interface; and maintaining at least one of a route entry/rule in the proxy entity to automatically loopback data flows from User Equipments (UEs)/backup Base Stations (BSs) to the at least one AS and vice-versa.

16. The BS, as claimed in claim 15, wherein the BS is at least one of a portable BS; and a stationary BS.

17. A Base Station (BS) in a Long Term Evolution (LTE) based communication network, the network comprising of an active BS, and at least one Application Server (AS), wherein the BS comprises:

a controller;

an integrated eNodeB (eNB)+Evolved Packet Core (EPC) module including a LTE radio interface and a proxy entity; and a User Equipment (UE) module including the LTE radio interface, wherein the controller is configured for:

enabling the UE module and the corresponding LTE radio interface to:

allow the BS to attach with the active BS for exchanging at least one information with the at least one AS, wherein the at least one information includes at least one of current location of the BS, power of the BS, and transmit power and height of the BS and the at least one information is used by the at least one AS for an election mechanism on receiving a notification of impending shutdown from the active BS, wherein the election mechanism includes analyzing the at least one information of the BS and assigning at least one weight to the at least one information to select the BS that can serve as the active BS; and receiving a command from the at least one AS based on the election mechanism that indicates the BS to act as the active BS; and enabling the integrated eNB+EPC module and the corresponding LTE radio interface and setting up the proxy entity of the integrated eNB+EPC module to allow the BS to act as the active BS based on at least one of the received command from the at least one AS depending upon the election mechanism and a pre-configured static ordering due to sudden shutdown of the active BS.

18. The BS, as claimed in claim 17, wherein the BS is at least one of a portable BS; and a stationary BS.

19. An Application Server (AS) in a Long Term Evolution (LTE) based communication network, the network comprising of an active Base Station (BS), and at least one backup BS, wherein the AS is connected to the active BS using a LTE air interface, wherein the AS comprises:

a memory; and a User Equipment (UE) module coupled to the memory, wherein the UE module includes a LTE radio interface and the UE module is configured for:

registering with a proxy entity of an integrated eNodeB (eNB)+Evolved Packet Core (EPC) module in the active BS for receiving information from User Equipments (UEs)/backup Base Stations (BSs);

receiving information from the active BS, wherein the information includes at least one of a battery status and signal strength, and identifying an impending shutdown of the active BS based on the information received from the active BS;

determining the at least one backup BS that can serve as the active BS using an election mechanism, on identifying the impending shutdown of the active BS, wherein determining the at least one backup BS using the election mechanism includes:

maintaining at least one information received from the at least one backup BS that is required for the election mechanism, wherein the at least one information includes at least one of current location of the at least one backup BS, power of the at least one backup BS, and transmit power and height of the at least one backup BS;

analyzing the at least one information received from the at least one backup BS;

selecting the at least one backup BS to serve as the active BS by assigning at least one weight to the received at least one information based on a deployment scenario; and sending a command to the at least one determined backup BS to act as the active BS.

* * * * *